United States Patent

[15] 3,706,891

[45] Dec. 19, 1972

Donofrio et al.

[54] A. C. STABLE STORAGE CELL

[72] Inventors: Nicholas M. Donofrio, Wappingers Falls, N.Y.; Richard H. Linton, Poughkeepsie, N.Y.

[73] Assignee: International Business Machines Corporation, Armonk, N.Y.

[22] Filed: June 17, 1971

[21] Appl. No.: 154,104

[52] U.S. Cl. ............307/238, 307/304, 340/173 CA, 340/173 R, 307/251

[51] Int. Cl. ............H03k 23/08

[58] Field of Search..307/238, 205, 221 C, 251, 279, 307/304; 340/173 CA, 173 R

[56] References Cited

UNITED STATES PATENTS

| | | | |
|---|---|---|---|
| 3,513,365 | 5/1970 | Levi | 307/251 |
| 3,582,909 | 6/1971 | Booher | 307/238 |
| 3,593,037 | 7/1971 | Hoff | 307/238 |
| 3,506,851 | 4/1970 | Polkinghorn | 307/251 |
| 3,480,796 | 11/1969 | Polkinghorn | 307/251 |
| 3,619,670 | 11/1971 | Heimbigner | 307/251 |
| 3,454,785 | 7/1969 | Norman | 307/251 |
| 3,586,875 | 6/1971 | Nicklas | 307/238 |

*Primary Examiner*—John S. Heyman
*Assistant Examiner*—R. E. Hary
*Attorney*—James E. Murray et al.

[57] ABSTRACT

This specification discloses an A.C. stable or stored charge storage cell for use in monolithic memories. The cell includes a capacitor that couples a drive line to a sense line. The capacitance of this capacitor is voltage dependent so that when charged it provides a high capacitance to couple signals on the drive line to the sense line and when discharged it provides a low capacitance to prevent the coupling of signals from the drive line to the sense line.

1 Claim, 5 Drawing Figures

INVENTORS
NICHOLAS M. DONOFRIO
RICHARD H. LINTON

BY James E. Murray
ATTORNEY

A. C. STABLE STORAGE CELL

BACKGROUND OF THE INVENTION

This invention relates to storage cells on monolithic memories and more particularly to A.C. coupled or stored charge storage cells for such memories.

In copending application Ser. No. 886,277, filed on Dec. 18, 1969 in the names of R. H. Linton et al. and assigned to the same assignee as the present invention, a storage cell is described in which data is stored on the capacitor biasing the gate of a field effect transistor. The voltage on this storage capacitor is regulated to bias the FET either conductive or nonconductive and thereby store data. To read the data stored in the cell, the state of the FET is then sensed to determine whether it is conductive or nonconductive. If it is determined that the FET is conductive a binary "1" is assumed stored in the cell. If it is determined that the FET is nonconductive a binary "0" is assumed stored in the cell.

Because of the described cell the data is stored as charge on a capacitor and this charge leaks off as time goes on; the type of cell referred to here is called an A.C. stable cell or stored charge storage cell. There are at least two problems with such a storage cell. One problem is that the charge on the storage capacitor leaks off as time goes on and it must be periodically regenerated or the data will be lost. Another problem is that typically the charge on the storage capacitor determines the magnitude of the signals supplied to the sense amplifier of the memory since signals cannot be passed through the FET which are larger in magnitude than the gate bias provided to the FET by the storage capacitor.

BRIEF DESCRIPTION OF THE INVENTION

In accordance with the present invention a new storage cell is provided which decreases the rate at which data in this type cell has to be regenerated and also provides A.C. stable or stored charge storage cells with larger sense signals for a given charge on the storage capacitor of the cell. This storage cell employs a voltage sensitive storage capacitor which is in a path coupling a drive line to a sense line. When this storage capacitor has no charge across it, it exhibits a very little capacitance decoupling the drive line from the sense line so that no signal or only a very small signal can be passed from the drive line to the sense line. However, when there is a voltage across the capacitor the capacitance of the capacitor increases markedly so as to provide a good path for signals between the drive line and the sense line.

Therefore, it is an object of the present invention to provide an improved A.C. stable or stored charge storage cell.

It is another object of the present invention to provide an A.C. stable or stored charge storage cell with improved regeneration characteristics.

It is another object of the present invention to provide an A.C. stable or stored charge storage cell with improved output signal characteristics.

DESCRIPTION OF THE DRAWINGS

These and other objects, features and advantages of the invention will be apparent from the following more particular description of the preferred embodiments of the invention as illustrated in the accompanying drawings, of which:

FIG 1 shows a two-device memory cell accessed by a bit line 10 and two word lines 12 and 14. The cell includes two FET's Q1 and Q2 which couple a storage capacitor Cs to the addressing lines 10–14. The capacitor is a polarized capacitor whose construction will be described a little later and which is covered in copending application Ser. No. 886,277 assigned to the same assignee as the present invention.

Figure 2:
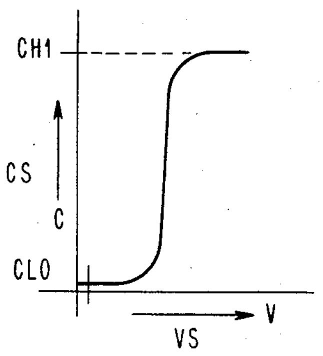
FIG. 2 is a capacitance versus voltage characteristic of the storage capacitor shown in FIG. 1.

The voltage versus capacitance characteristics of the particular capacitor CS are illustrated in FIG. 2. When the voltage across the capacitor is small the capacitance of the capacitor is also small. However, as the voltage increases so does the capacitance until a point is reached where the capacitor exhibits a very high capacitance. This capacitor CS is connected between the gate and drain of device Q2 to function as a feedback capacitor which determines whether device Q2 is conductive or nonconductive.

To write data into this capacitor the bit line driver 16 selectively charges the bit line 10 to a positive potential or pulls bit line 10 to ground potential while the word read line 14 is maintained at ground potential. If a binary "0" is to be stored in the cell, the bit line drawer 16 pulls bit line 10 to ground potential. Thereafter a positive pulse is applied to the word write line 12 by a work write line driver 18. Since bit line 10 is at ground potential, the storage capacitor CS is discharged through device Q1 to ground potential. The storage capacitor CS exhibits very little capacitance for low voltages across it as shown in FIG. 2. With the capacitor CS in this low capacitance state the cell stores a binary "0". If a binary "1" is to be stored in the cell, the bit line driver 16 charges bit line 10 to a positive potential. The word write line driver then provides a pulse to the gate of device Q1. Device Q1 is rendered conductive causing current to flow from the bit line 10 through device Q1 charging capacitor CS to some potential which makes the capacitor CS have a high capacitance. With the capacitor CS in this state the storage cell stores a binary "1".

To read data stored in the storage cell, the bit line driver 16 first places the bit line 10 at zero potential while the word write line driver 18 is maintained at zero potential to maintain device Q1 off during the read operation. Thereafter, a pulse is applied to the word read line 14 by the word read line driver 20. If a binary "0" is stored in the storage cell capacitor CS will have no voltage across it and have little capacitance. Therefore, the gate of device Q2 will be biased at ground potential and will be decoupled from the word line 14. This, of course, biases device Q2 off so that the pulse applied to the word read line 12 is isolated from the bit line 10 by the off device Q2. However, if a binary "1" is stored in the storage cell it biases the gate of device Q2 at least one threshold level above ground potential or the potential on the bit line 10. Thus, when a pulse is applied to the word read line device Q2 conducts causing the pulse on line 14 to be transferred through device Q2 to the bit line 10.

As the potential on the bit line 10 rises with the transferred pulse, the potential at the gate also increases because the capacitor CS feeds the pulse on the word read line 14 to the gate raising the potential of the gate by the magnitude of the pulse. Since the voltage on the bit line 10 is increased by the potential of the pulse, device Q2 will not be turned off as the potential on the bit line 10 rises because the gate of device Q2 is maintained at least one threshold level above the source of device Q2.

It can be seen then that, in accordance with the present invention, a large pulse can be transferred from the word read line 14 to the bit line 10 without storing, on capacitor CS, a voltage significantly in excess of the threshold voltage for the device Q2. For this reason the present invention has two important effects. First of all, the present invention allows larger pulses to be transferred from the driven line 14 to the sense line 10 to make sensing them by the sense amplifier 22 an easier job. Secondly, the present invention permits regeneration of A.C. stable or stored charge storage cells at less frequent intervals without causing a significant degeneration in the sense signal. This second advantage of the invention is obtained because the charge on the capacitor CS must only be maintained sufficient to bias device Q2 on and capacitor CS at a high level of capacitance and does not have to be held above the level of the desired signal as is the case of the storage cell in the mentioned copending application. These are two important features of the present invention which significantly improve the performance of A.C. stable or stored charge storage cells.

While the storage cell is not being accessed for reading or writing the accessing lines 10 to 14 are maintained at zero potential to maintain devices Q1 and Q2 off. This minimizes the leakage of charge off capacitor CS. However, as time goes on charge does leak off capacitor CS so that the data stored in the capacitor CS must be periodically regenerated or it will be lost. Regeneration is accomplished by performing successively the read and write operations described above. Data is first read out of the cell onto the bit line 10 where its nature is determined by the sense amplifier 22. Then the sensed data is rewritten back into the cell by performing the write operation described above to restore the data. Restoration may be accomplished in other ways too. However, the manner in which restoration is accomplished does not constitute part of the present invention and will not be gone into here.

Figure 3:
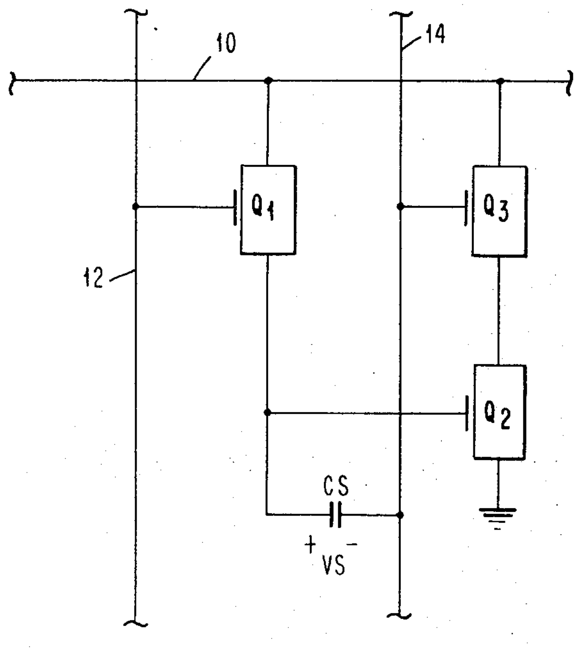
FIG. 3 is an electrical schematic of the storage cell using three FET devices and a capacitor with the capacitance versus voltage characteristic shown in FIG. 2.

In the embodiment just described two FET devices and a storage capacitor CS forming a feedback loop around one of the devices Q2 were used to perform a storage function. In the embodiment of FIG. 3 three devices Q1, Q2 and Q3 are used with a storage capacitor CS which does not function as a feedback capacitor as it does in the embodiment of FIG. 1.

To write data into the storage cell of FIG. 3 the bit line potential is again selectively charged to a positive potential or pulled to ground potential while the word read line 14 is held clamped at ground potential. If a binary "1" is to be stored in the cell, the bit line 10 is charged to a positive potential. Thereafter the word write line 12 is pulsed positive so as to bias device Q1 on and cause current to flow from bit line 10 to the internal storage node of the cell thereby charging the capacitor CS. This causes the capacitor to be charged to its high capacitance state thereby storing a binary "1" on the capacitor. If a binary "0" is to be stored in the storage cell the bit line 10 is pulled to ground potential and the word write line 12 is pulsed positive while the word read line 14 is held at ground potential. This biases device Q1 on but since the bit line is at ground potential, the internal storage node is also pulled to ground potential through device Q1 thereby discharging the storage capacitor CS. This leaves the capacitor CS in its low capacitance state for a stored binary "0".

Now assume data is to be read out of the cell. First of all, the word write line is maintained at ground potential to maintain device Q1 off while the potential on the bit line 10 is raised. An interrogation pulse is then applied to the word read line 14. If the capacitor CS is charged to the proper potential to store a binary "1", it exhibits a high capacitance therefore coupling the gate of device Q2 to the word read line 14 so that the pulse applied to the word read line 14 is transmitted to the base of device Q2 to turn device Q2 on. Similarly, the pulse on line 14 turns device Q3 on so that devices Q2 and Q3 together form a discharge path for the potential on the bit line 10, thereby causing a pulse on the bit line that can be detected by the sense amplifier for the storage cell. If a binary "0" is stored in the storage cell there is no voltage across capacitor CS. Capacitor CS therefore exhibits very little capacitance so that the gate of device Q2 is decoupled from the word line 14 so that when the pulse is applied to the word line 14 device Q2 is left off. Therefore, when device Q3 is biased on by the write line pulse device Q2 stays off preventing a path being established discharging bit line 10 to ground. The absence of a discharge pulse on the bit line 10 indicates that a binary "0" is stored in the cell.

As can be seen again in this embodiment of the invention, the magnitude of the charge on the capacitor CS again does not limit the size of the pulse that can be applied to the bit line 10 since the function of the capacitor CS here is only to couple and uncouple the gate of device Q2 to the word read line 14 and therefore the magnitude of the voltage on the capacitor CS does not directly enter into turning of device Q2 on or off. Instead, the pulse applied to the word line 14 effectively controls the gate of device Q2. Therefore, again the read pulse's magnitude is not limited by the charge on capacitor CS and regeneration is not as critical as with prior art storage cells of this type.

While this cell is not being interrogated for reading or writing the voltages on the addressing lines 10–14 are kept at zero potential to maintain devices Q1 to Q3 off. This minimizes leakage of charge off capacitor CS. However, as time goes on charge does leak off capacitor CS so that the data stored in the capacitor CS must be regenerated periodically or it will be lost. This is accomplished by performing successive read and write operations as described above. Data is first read out of the cell onto the bit line 10 and sensed as in a normal read operation. Then the sensed data is written back into the cell by performing a write operation to restore the data. Restoration may be accomplished in other ways too. However, how restoration is accomplished does not constitute part of the present invention and will not be gone into here.

Figure 1:
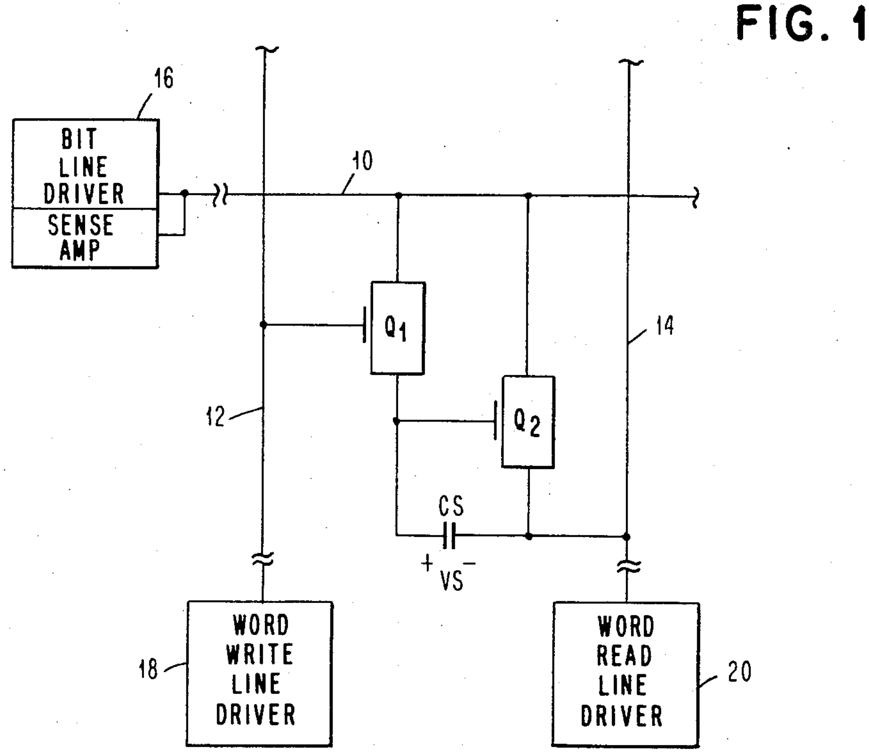
FIG. 1 is an electrical schematic of one embodiment of the invention using two FET devices.
Figure 4:
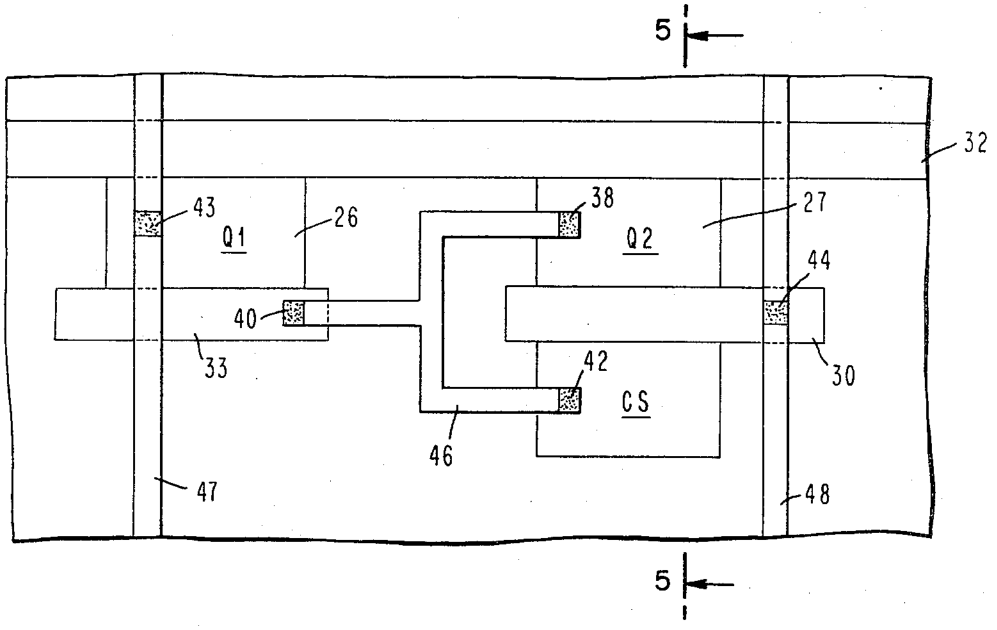
FIG. 4 is a plan view of a monolithic layout for the storage cell in FIG. 1.
Figure 5:
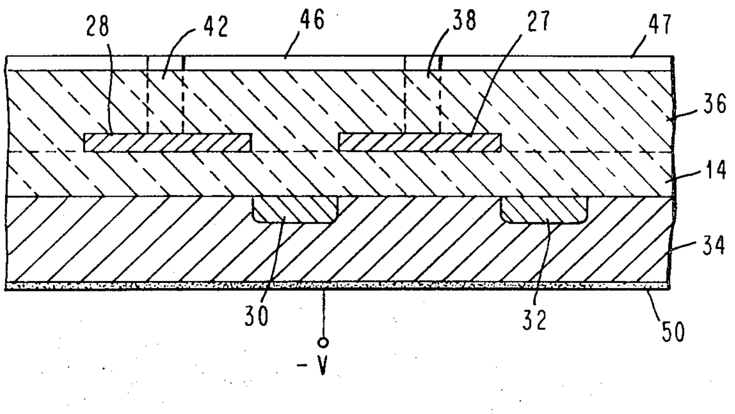
FIG. 5 is a section taken along line 5—5 in FIG. 4.

The storage cell shown in FIG. 1 can be constructed as shown in FIGS. 4 and 5 using the silicon gate process. In the silicon gate process a silicon layer is laid down over an oxide layer on a monolithic chip. The silicon chip layer is then etched away in areas where the drain and source diffusions are to be made and remaining sections of the silicon layer are used as gate areas for the field effect transistor and for connections. As shown, the silicon layer overlaying the thin oxide layer 24 is split by etching into three sections, one section 26 forming the gate for the field effect transistor Q1, another section 27 forming the gate of field effect transistor Q2 and the final section 28 forming one of the plates for the capacitor CS. The oxide layer 24 is then stripped away in three sections. The N-type diffusions 30, 32 and 33 are then made into the P-type substrate 34, to form the bit line 10 and the source and drain diffusions of devices Q1 and Q2. Once the diffusions are complete a thick oxide layer 36 is formed to overlay the whole structure and it is etched to receive metalization to form the metal contacts 38, 40, 42, 43 and 44 to the drain, source, gates of the transistors Q1 and Q2 and the plate of the capacitor CS. The gate contact 38 for device Q2, the source contact 40 for device Q1 and the plate contact 42 for capacitor CS are joined by a metal strip 46 and metal strips 47 and 48 are made to the gate contact 43 for device Q1 and the source contact 44 for device Q2, respectively, to form the word write and read lines 12 and 14. A negative potential –V is applied to the substrate 34 through a metal layer 50 to provide the substrate bias. Now, when the gate terminal 38 of device Q2 is made positive with respect to the source terminal 44 of device Q2, charge is drawn under the plate 28 from the –V substrate bias providing a negative charge layer under the plate 28. This negative charge neutralizes the rectifying junction of the source diffusion 30 adjacent the plate 28 so that the source diffusion 30 and the negative charge form a continuous conductive second plate of the capacitor CS and the thin oxide layer 24 under the plate 28 forms the dielectric for the capacitor.

The capacitance of this capacitor (between plate 28 and diffusion 30) is a function of the potential and varies in accordance with the curve of FIG. 2. When the potential between the plate 28 and diffusion 30 is zero the capacitance is negligible. However, as the voltage applied between the gate and source is increased the capacitance goes up markedly until some potential is reached where the capacitance levels off. It is found in making capacitors in the manner described above higher capacitances could be obtained than in other ways of making capacitors on monolithic chips.

In fabricating the structure a normal impurity level for FET's can be used. For instance, the P substrate can have impurity concentration of $10^{16}$ impurities/$CM^3$ while diffusions 30, 32 and 33 and conductive layers 26 and 28 can have impurity concentration of $10^{20}$ impurities/$CM^3$. The A.C. current path from the conducting layer 28 to the diffusion 30 is a high impedance due to the presence of the rectifying junction. However, as pointed out above, the negative charge attracted under the conducting plate forms a conductor which lowers the impedance of this path and creates a capacitor between the plate 28 and diffusion 30.

Therefore, while the invention has been shown and described with respect to the preferred embodiments thereof, it will be understood by those skilled in the art that various changes in form and detail may be made therein without departing from the spirit and scope of the invention.

What is claimed is:

1. In a stored charge storage cell addressed by the selection of a plurality of lines out of a grid of addressing lines and having a capacitor as its storage element, the improvement comprising:

a. a voltage dependent capacitor coupling the first of the selection lines to a second of the selection lines to control the passage of signals between the two lines, said capacitor having two states of capacitance, one low capacitance state when a small voltage is impressed across the capacitor and a second high capacitance state when a large voltage is impressed across the capacitor; and b. data writing means for controlling the potential across said voltage dependent capacitor to place said capacitor in its low capacitance state to store one state of binary data on its high capacitance state, to store the other state of binary data whereby the said two lines are coupled or decoupled depending on the binary path stored in the capacitor, said date writing means including a first field effect transistor with its gate coupled to a third of the selection lines, one of its gated terminals coupled to the first of the selection lines and the other of its gated terminals coupled through the voltage dependent capacitor of the second of the selection lines so that the potential on the third of the selection lines controls whether the voltage dependent capacitor is charged or not by a potential existing between the first and second of the selection lines;

a source of reference potential; and second and third field effect transistors with their gated terminals connected in series between the first of the addressing lines and a source of fixed reference voltage to form a discharge path between the first of the addressing lines and the source of reference potential when both the second and the third transistors are rendered conductive, the gate of the third field effect transistor being connected directly to the second of the addressing lines so that the third transistor is always rendered conductive to an interrogating pulse on the second of the addressing lines while the gate of the third transistor is connected through the voltage sensitive capacitor to the second of the addressing lines so that the second transistor is rendered conductive only when the voltage sensitive capacitor is in its high capacitance state whereby charging and discharging of the potential on the first of the addressing lines indicates what state has been stored in the storage cell by the placing of the voltage sensitive capacitor in its low or high voltage state.

* * * * *